United States Patent
Hu

(10) Patent No.: US 9,994,325 B2
(45) Date of Patent: *Jun. 12, 2018

(54) POLYETHER URETHANE DEICER BOOTS

(71) Applicant: Goodrich Corporation, Charlotte, NC (US)

(72) Inventor: Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/140,075

(22) Filed: Apr. 27, 2016

(65) Prior Publication Data

US 2016/0347460 A1    Dec. 1, 2016

Related U.S. Application Data

(60) Provisional application No. 62/166,530, filed on May 26, 2015.

(51) Int. Cl.
| | | |
|---|---|---|
| *B64D 15/16* | (2006.01) | |
| *C08J 5/18* | (2006.01) | |
| *D01F 6/70* | (2006.01) | |

(52) U.S. Cl.
CPC ........... *B64D 15/16* (2013.01); *B64D 15/166* (2013.01); *C08J 5/18* (2013.01); *D01F 6/70* (2013.01);
(Continued)

(58) Field of Classification Search
CPC ....... B64D 15/166; B29C 70/14; B29C 70/18; B29C 70/42; D01D 5/003; B29K 2075/00;
(Continued)

(56) References Cited

U.S. PATENT DOCUMENTS

| | | | | |
|---|---|---|---|---|
| 4,613,102 A * | 9/1986 | Kageorge | ............. | B64D 15/166 244/134 A |
| 4,687,159 A * | 8/1987 | Kageorge | ............. | B64D 15/166 244/134 A |

(Continued)

FOREIGN PATENT DOCUMENTS

| | | | | |
|---|---|---|---|---|
| EP | 0720946 A1 * | 7/1996 | ............. | B64D 15/00 |
| EP | 0720946 A1 | 7/1996 | | |

(Continued)

OTHER PUBLICATIONS

W.K. Son et al., "Preparation of Antimicrobial Ultrafine Cellulose Acetate Fibers with Silver Nanoparticles", from Macromolecular Rapid Communication, 2004, pp. 1632-1637.

(Continued)

*Primary Examiner* — Justin M Benedik
(74) *Attorney, Agent, or Firm* — Kinney & Lange, P.A.

(57) ABSTRACT

A deicer includes an aircraft structure and an outer layer with a sheet having a brittle point lower than −40° C. (−40° F.). The sheet includes a polyether urethane elastomer. A deicer includes an aircraft structure and an outer elastomer layer. The outer elastomer layer includes a non-woven fabric having polyether urethane fibers and one of (1) a carbon allotrope material aligned with at least one of the polyether urethane fibers and (2) a polyester urethane composition located on a portion of the non-woven fabric. A method of forming a layer of a deicer boot includes forming a polyether urethane elastomer sheet having a brittle point lower than −40° C. (−40° F.) and incorporating the polyether urethane elastomer sheet onto an aircraft structure.

18 Claims, 3 Drawing Sheets

(52) U.S. Cl.
CPC ........ *C08J 2375/06* (2013.01); *C08J 2375/08* (2013.01); *D10B 2401/061* (2013.01); *D10B 2505/20* (2013.01)

(58) Field of Classification Search
CPC ........ B29K 2105/0863; B29K 2105/16; B29K 2505/02; B29K 2507/04; B29L 2031/2085
See application file for complete search history.

(56) References Cited

U.S. PATENT DOCUMENTS

| | | | | |
|---|---|---|---|---|
| 4,690,353 | A * | 9/1987 | Haslim | B64D 15/163 244/134 D |
| 5,098,037 | A * | 3/1992 | Leffel | B64D 15/166 244/134 A |
| 5,164,242 | A * | 11/1992 | Webster | B64D 15/16 156/60 |
| 5,314,145 | A | 5/1994 | Rauchhorst, III et al. | |
| 5,337,978 | A * | 8/1994 | Fahrner | B64D 15/166 244/134 A |
| 5,544,845 | A | 8/1996 | Giamati et al. | |
| 5,558,304 | A * | 9/1996 | Adams | B64D 15/00 244/134 A |
| 5,609,314 | A * | 3/1997 | Rauckhorst | B64D 15/16 244/134 A |
| 5,743,494 | A * | 4/1998 | Giamati | B64D 15/00 244/134 A |
| 5,921,502 | A * | 7/1999 | Al-Khalil | B64D 15/163 244/134 A |
| 6,352,601 | B1 * | 3/2002 | Ray | B64D 15/00 156/71 |
| 6,520,452 | B1 | 2/2003 | Grist et al. | |
| 7,070,836 | B2 | 7/2006 | Czado | |
| 7,832,983 | B2 | 10/2010 | Kruckenberg et al. | |
| 8,662,449 | B2 | 3/2014 | Shah et al. | |
| 8,664,573 | B2 | 3/2014 | Shah et al. | |
| 9,598,176 | B2 * | 3/2017 | Giamati | B64D 15/166 |
| 2006/0094320 | A1 | 5/2006 | Chen et al. | |
| 2009/0326128 | A1 | 12/2009 | Macossay-Torres | |
| 2011/0027067 | A1 | 2/2011 | Kennedy, III et al. | |
| 2011/0143087 | A1 | 6/2011 | Alberding et al. | |
| 2012/0224897 | A1 * | 9/2012 | Qi | B82Y 30/00 399/333 |
| 2013/0115420 | A1 | 5/2013 | Park et al. | |
| 2014/0065422 | A1 | 3/2014 | Kim et al. | |

FOREIGN PATENT DOCUMENTS

| | | |
|---|---|---|
| GB | 1477055 | 6/1977 |
| WO | WO2006123858 A1 | 11/2006 |
| WO | WO2009094506 A1 | 7/2009 |

OTHER PUBLICATIONS

L.Y. Yeo et al., "Electrospinning Carbon Nanotube Ploymer Composite Nanofibers", from Journal of Experimental Nanoscience, Jun. 2006, pp. 177-209.

S. Sirinrath et al., "Skeletal Myotube Formation Enhanced by Electrospun Polyurethane Carbon nanotube Scaffolds", from International Journal of Nanomedicine, 2011, pp. 2483-2497.

M. Gopiraman et al., "Structural and Mechanical Properties of Cellulose Acetate/Graphene Hybrid Nanofibers: Spectroscopic Investigations", from eXPRESS Polymer Letters, 2013, pp. 554-563.

Q. Dong et al., "Ultrasound-assisted Preparation of Electrospun Carbon Nanofiber/Graphene Composite Electrode for Supercapacitors", from Journal of Power Sources, 2013, pp. 350-353.

Extended European Search Report for Application No. 16171103.1, dated Sep. 20, 2016, 9 Pages.

* cited by examiner

POLYETHER URETHANE DEICER BOOTS

CROSS-REFERENCE TO RELATED APPLICATION(S)

This application claims the benefit of U.S. Provisional Application No. 62/166,530 filed May 26, 2015 for "Polyether Urethane Deicer Boots" by Jin Hu.

BACKGROUND

Accumulation of ice on aircraft wings and other aircraft structures during flight is a problem that is well known. A variety of techniques have been used to remove ice from aircraft during flight including chemical deicing (applying chemicals to aircraft structures to reduce ice adhesion forces or reduce the freezing point of water that collects on the aircraft), thermal deicing (actively heating aircraft structures to prevent ice formation or loosen accumulated ice), and pneumatic deicing (using inflatable elements to expand the profile of an aircraft structure to crack accumulated ice).

Some state of the art pneumatic deicers (sometimes called deicer boots) employ a neoprene or polyester urethane outer layer positioned over a natural rubber inner layer, which is connected to an aircraft structure. Inflation tubes are positioned between the inner layer and the aircraft structure. The inflation tubes inflate causing portions of the outer and inner layers to move away from the aircraft structure. This movement deforms the outer layer so that ice that has accumulated on the outer layer cracks and is shed from the outer layer. Neoprene and polyester urethane outer layers generally possess adequate toughness, wind and sand erosion resistance, and chemical resistance to fuel and oil, but do not generally retract well at low temperatures. The natural rubber inner layer is used to improve the elasticity and retractability of the outer layer. The present disclosure describes improved compositions for deicer boots.

SUMMARY

A deicer includes an aircraft structure and an outer layer with a sheet having a brittle point lower than −40° C. (−40° F.). The sheet includes a polyether urethane elastomer.

A deicer includes an aircraft structure and an outer elastomer layer. The outer elastomer layer includes a non-woven fabric having polyether urethane fibers and one of (1) a carbon allotrope material aligned with at least one of the polyether urethane fibers and (2) a polyester urethane composition located on a portion of the non-woven fabric.

A method of forming a layer of a deicer boot includes forming a polyether urethane elastomer sheet having a brittle point lower than −40° C. (−40° F.) and incorporating the polyether urethane elastomer sheet onto an aircraft structure.

DETAILED DESCRIPTION

The present disclosure describes elastomeric deicer boots having improved elasticity and mechanical strength compared to the currently deployed neoprene and polyester urethane deicer boots. The outer elastomeric layer of pneumatic deicer boots according to the present disclosure contains polyether urethane elastomers. Polyether urethanes generally have a lower glass transition temperature than the polyester urethanes currently used in deicer boots. Polyether urethanes can be electrospun to form a scaffold. The scaffold can be filled with a polyester urethane and/or other compositions. In some cases, the polyether urethanes are electrospun with a carbon material (carbon nanotubes, graphene, etc.). The polyether urethane layer can be used to replace the polyester urethane layer (and potentially the natural rubber layer typically located below the polyester urethane layer).

Figure 1:
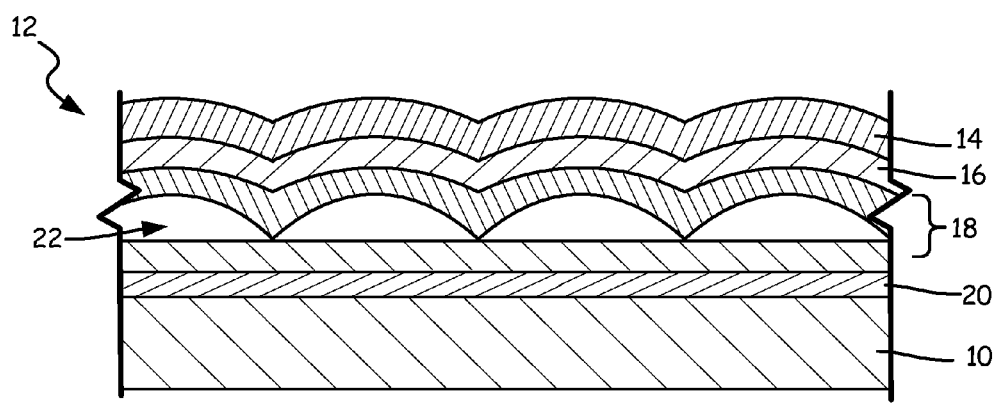
FIG. 1 is a perspective view of a pneumatic deicer boot in a distended condition.

FIG. 1 illustrates an aircraft component having a deicer boot according to the present disclosure. As shown in FIG. 1, aircraft component 10 is a wing. However, aircraft component 10 can also be a fairing, strut or any other externally exposed aircraft structure that can accumulate ice during operation of the aircraft. Deicer boot 12 includes outer layer 14, inner layer 16, carcass layer 18 and bond layer 20.

Outer layer 14 is located on the external surface (or breezeside) of aircraft component 10. The composition of outer layer 14 is described in greater detail below. Inner layer 16 is located between outer layer 14 and aircraft structure 10. According to the prior art, inner layer 16 provides support for the retraction of outer layer 14. Inner layer 16 often contains a natural rubber. According to the present disclosure, inner layer 16 can be present as shown in FIG. 1. Alternatively, the composition of outer layer 14 allows for the omission of inner layer 16 entirely. Carcass layer 18 is located between inner layer 16 and aircraft structure 10. Carcass layer 18 includes inflation tubes 22. Inflation tubes 22 communicate with an air supply located on the aircraft (not shown). When air from the air supply is delivered to inflation tubes 22, inflation tubes 22 expand causing carcass layer 18, inner layer 16 and outer layer 14 to move away from aircraft structure 10. FIG. 1 shows outer layer 14 in a distended condition (i.e. inflation tubes 22 are pressurized). This movement causes accumulated ice on outer layer 14 to crack and be removed from outer layer 14.

In prior art deicer boots, the outer layer typically contained neoprene or a polyester urethane, and the inner layer was typically a natural rubber. The neoprene or polyester urethane elastomer layer provided erosion and chemical resistance, but had relatively poor elasticity at low temperatures. The natural rubber layer provided the elasticity needed for the outer layer to retract and reform to the aircraft structure once the inflation tubes were deflated. A carbon material (e.g., carbon black) could be added to the prior art elastomer layer to improve conductivity and reduce the likelihood of static discharge and provide additional strength. However, the carbon material was generally added to the elastomer in a non-ordered fashion (i.e. simple mixing). This resulted in a random distribution of carbon material throughout the elastomer layer. According to the present disclosure, outer layer 14 possesses the necessary strength, erosion resistance, and elasticity to eliminate the need for the natural rubber layer used in prior art deicer boots and yields a breezeside layer that has advantages compared to an elastomer containing randomly distributed carbon black.

Outer layer 14 contains a polyether urethane elastomer. Polyether urethanes are formed by reacting an isocyanate and a polyol having multiple ether groups. In some embodiments, the polyether urethanes have a brittle point that is less than about −40° C. (−40° F.). A material's brittle point refers to the temperature at which it exhibits brittle failure under specific impact conditions. In still other embodiments, the polyether urethanes have a brittle point that is less than about −55° C. (−67° F.).

In some embodiments, outer layer 14 is a polyether urethane elastomer sheet. Polyether urethanes are fused or melted together to form the sheet. In other embodiments, outer layer 14 is formed from a non-woven fiber fabric that includes a plurality of polyether urethane fibers. The polyether urethane fibers can be nanofibers (diameters less than 1000 nanometers) or microfibers (diameters smaller than a strand of silk) or a mixture of nanofibers and microfibers. The polyether urethane fibers in the non-woven fabric are fused or melted together to form a solid sheet. Suitable polyether urethane compositions include Estane® 58201 (an 82A polyether-type thermoplastic polyurethane) and Estane® 58123 (an aromatic polyether-based thermoplastic polyurethane), both available from Lubrizol Advanced Materials, Inc. (Cleveland, Ohio).

In some embodiments of the present disclosure, the non-woven fiber fabric of outer layer 14 also includes a carbon allotrope material that is aligned with one or more of the plurality of polyether urethane fibers. The carbon allotrope material is aligned with a polyether urethane fiber so that it is contained within or on the surface of the polyether urethane fiber. Suitable carbon allotrope materials include carbon nanotubes, graphene, graphite and carbon black. Carbon nanotubes can be single-walled carbon nanotubes or multi-walled carbon nanotubes. By aligning the carbon allotrope materials with polyether urethane fibers, the non-woven fiber fabric of outer layer 14, which is subsequently fused or melted to formed a solid sheet, is strengthened when compared to elastomers that are simply mixed with a carbon material in a non-ordered fashion.

In one embodiment of the present disclosure, a carbon allotrope material is aligned with a polyether urethane fiber by electrospinning the polyether urethane fiber with the carbon allotrope material. Electrospinning uses an electric charge to draw a very fine fiber from a polymer solution. When a sufficiently high voltage is applied to a liquid droplet, the liquid becomes charged and electrostatic repulsion counteracts the surface tension of the droplet causing the droplet to stretch. Once a critical point is reached, a stream of liquid erupts from the surface of the droplet. Where the molecular cohesion of the liquid is sufficiently high, a charged liquid jet is formed. The jet is elongated due to electrostatic repulsion initiated at small bends in the fiber and is deposited on a grounded collector. The jet dries in flight, resulting in a uniform fiber due to the elongation and thinning of the fiber due to the bending instability caused by the electrostatic repulsion. The polymer (polyether urethane) solution can include the carbon allotrope material so that when the solution is electrospun, the carbon allotrope material is contained within the resulting electrospun fiber.

Figure 2:
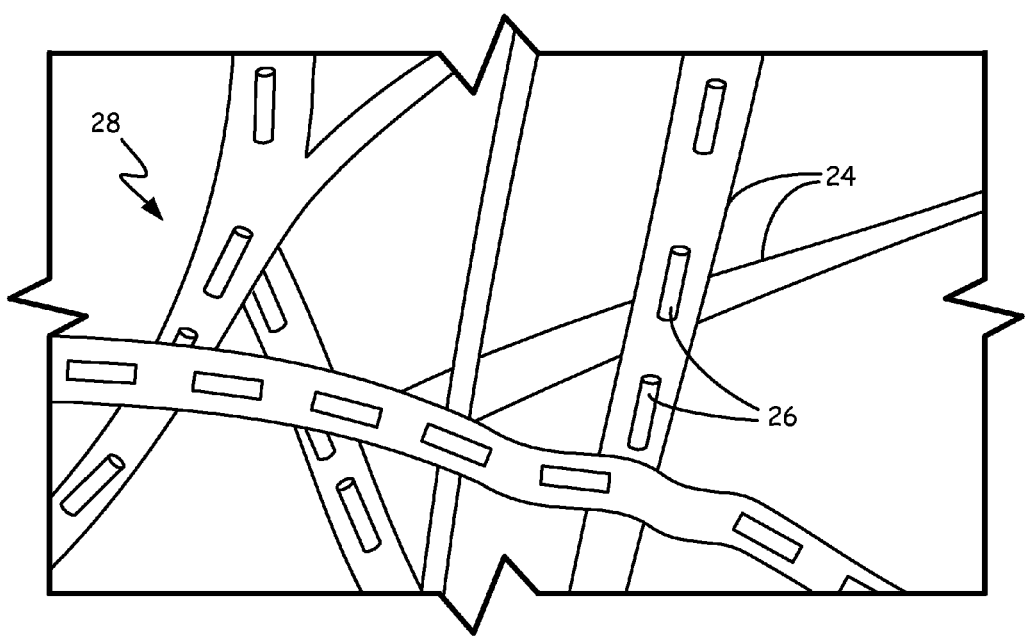
FIG. 2 is a schematic view of a carbon material aligned with a nanofiber by electro spinning.

FIG. 2 schematically illustrates one example of a carbon allotrope material contained within a polyether urethane fiber. Polyether urethane fiber 24 is formed at the spinning tip of an electrospinning apparatus (not shown). The electrospinning apparatus can include a power supply and pump for delivering the polyether urethane solution. Polyether urethane fiber 24 is aligned with carbon allotrope material 26 by electro spinning as described above. While some amount of "tangling" or "intertwining" can occur during electrospinning, the polyether urethane fibers (with the carbon allotrope material) form a non-woven fiber fabric. A number of polyether urethane fibers, some with aligned carbon allotrope materials, are joined together to form the non-woven fiber fabric. Together, polyether urethane fibers 24 create scaffold 28.

Not all polyether urethane fibers in the non-woven fiber fabric need to contain aligned carbon allotrope material. In some embodiments, only a portion of the polyether urethane fibers contain aligned carbon allotrope material. The loading of carbon allotrope material in outer layer 14 can vary. In embodiments where conductivity is the primary concern, the carbon allotrope material can have a relatively low loading. For example, the non-woven fiber fabric of outer layer 14 can contain about 0.5% carbon nanotubes by weight to provide outer layer 14 with the necessary conductivity to prevent static discharges that can damage outer layer 14 and aircraft structure 10. This loading level also provides more mechanical strength benefits than non-aligned carbon nanotubes at the same concentration. In other embodiments, the non-woven fiber fabric of outer layer 14 can contain about 0.5% graphene or carbon black by weight. In embodiments where mechanical strength is a primary concern, the carbon allotrope material can have a heavier loading. For example, the non-woven fiber fabric of outer layer 14 can contain up to about 5% carbon nanotubes by weight to improve the strength and erosion resistance of outer layer 14. In other embodiments, the non-woven fiber fabric of outer layer 14 can contain up to about 5% graphene or carbon black by weight.

In some embodiments, non-woven fiber fabrics with polyether urethane fibers 24 and aligned carbon allotrope material 26 are melted and/or cured following electrospinning to form a fabric sheet that can be applied as outer layer 14 to aircraft structure 10. In other embodiments, additional non-electrospun elastomers are applied to the non-woven fiber fabric formed by electrospinning. Furthermore, additives such as antioxidants and carbon black can be incorporated into the additional non-electrospun elastomers. The additional non-electrospun elastomers can be applied to the non-woven fiber fabric by hot pressing, soaking, dipping, brushing, spraying or using other deposition techniques. In some embodiments, the non-woven fiber fabric is applied to rubber inner layer 16 to further improve the elasticity of outer layer 14. In this case, the rubber inner layer is positioned proximate to aircraft structure 10 while the non-woven fiber fabric of outer layer 14 is on the breezeside.

Figure 3:
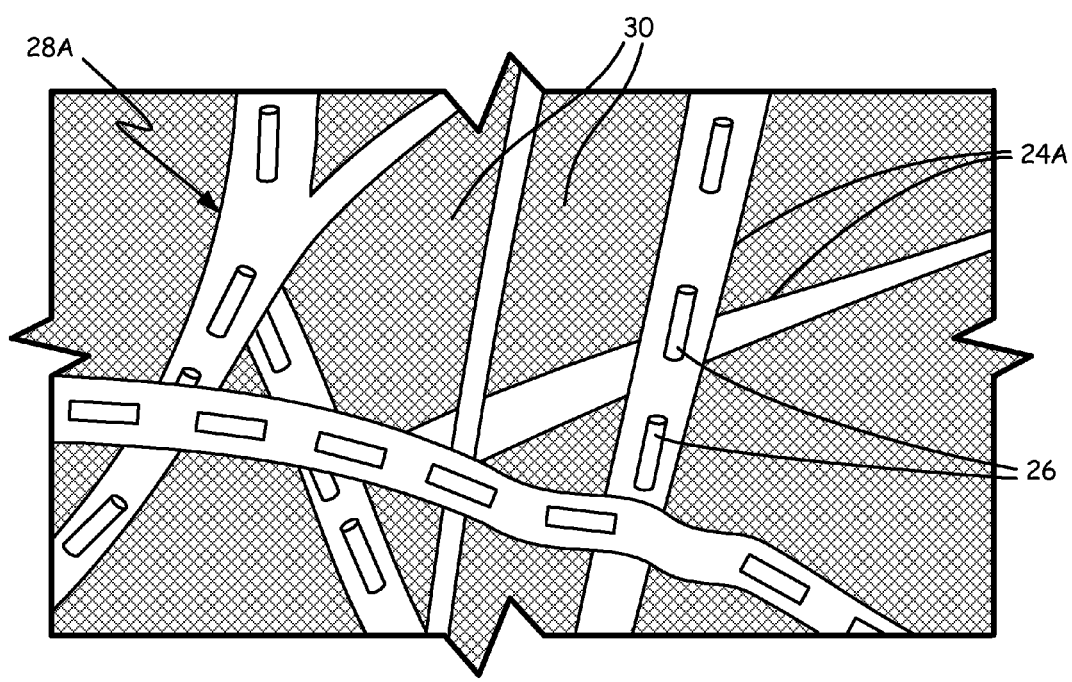
FIG. 3 is a schematic view of a polyether urethane elastomer scaffold containing a polyester urethane composition.

In other embodiments, polyether urethane fibers 24 (with or without aligned carbon allotrope material 26) form a scaffold, lattice or elastomer network. FIG. 3 illustrates a schematic view of a polyether urethane scaffold in which polyether urethane fibers 24A contain aligned carbon nanotubes 26. In one embodiment, scaffold 28A is constructed from a plurality of interconnected polyether urethane fibers 24A. Polyether urethane fibers 24A form a network of fibers. Scaffold 28A is a structure that can incorporate additional compositions both on its external surface or internally (i.e. within fibers of scaffold 28A). For example, additives such as those described above (e.g., antioxidants and carbon black) can be incorporated onto or into scaffold 28A. In some embodiments, a polyester urethane composition is incorporated onto or into scaffold 28A. Suitable polyester urethane compositions include Estane® 58070 (a polyester-based thermoplastic polyurethane resin) available from Lubrizol Advanced Materials, Inc. (Cleveland, Ohio). The polyester urethane composition can be applied to scaffold 28A by hot pressing, soaking, dipping, brushing, spraying or using other deposition techniques. FIG. 3 shows polyester urethane composition 30 between fibers 24A of scaffold 28A, completely filling the voids between fibers in scaffold 28A. Including polyester urethane composition 30 within scaffold 28A can provide additional environmental resistance for outer layer 14, including fuel and oil resistance.

Polyester urethanes can also be introduced into the elastomer sheet used to form outer layer 14. The fiber fabric of outer layer 14 can be electrospun to include both polyether urethanes and polyester urethanes. In this embodiment, the polymer solution that is electrospun can include both the polyether urethanes and polyester urethanes. In other embodiments, the elastomer sheet used to form outer layer 14 is formed by extruding a mixture of polyether urethane and polyester urethane compounds.

As described above, a method of forming a layer of a deicer boot includes the steps of forming a polyether urethane elastomer sheet and incorporating the sheet onto an aircraft structure. The step of forming the polyether urethane elastomer sheet can include electrospinning polyether urethane fibers and fusing or melting the polyether urethane fibers together. Carbon allotrope materials can be electrospun with the polyether urethane fibers so that the carbon allotrope materials are contained within or on the fibers. A non-woven fabric scaffold can be formed with the polyether urethane fibers, and a polyester urethane composition applied to the scaffold.

Utilizing polyether urethane elastomer fibers in outer layer 14 provides a number of benefits compared to conventional neoprene and polyester urethane compositions. While neoprene and polyester urethanes possess strong resistance to fuel and oil, they do not retract well at low temperatures. Polyether urethanes generally have a lower brittle point and glass transition point than polyester urethanes, which makes them more suitable for low temperature applications experienced during flight. As a result, polyether urethanes will retract better at lower temperatures (e.g., −40° C.) so that the deicer boot reforms properly when retracted. Polyether urethanes also have better hydrolytic degradation resistance than polyester urethanes. Additionally, natural rubber does not have strong resistance to ozone degradation, while polyether urethanes do. Outer layer 14 having polyether urethanes can provide additional protection from ozone degradation for inner layer 16, when present. These benefits allow for the replacement of polyester urethane and/or natural rubber layers in current deicer boots while providing enhanced performance capabilities.

DISCUSSION OF POSSIBLE EMBODIMENTS

The following are non-exclusive descriptions of possible embodiments of the present invention.

A deicer can include an aircraft structure and an outer layer comprising a sheet having a brittle point lower than −40° C. (−40° F.) where the sheet includes a polyether urethane elastomer.

The deicer of the preceding paragraph can optionally include, additionally and/or alternatively, any one or more of the following features, configurations and/or additional components:

A further embodiment of the foregoing deicer can include an inner elastomer layer located between the outer layer and the aircraft structure and a carcass layer having inflation tubes and located between the aircraft structure and the inner layer.

A further embodiment of any of the foregoing deicers can include that the sheet is thermally fused from a plurality of non-woven electrospun polyether urethane fibers.

A further embodiment of any of the foregoing deicers can include a carbon allotrope material selected from the group consisting of carbon nanotubes, graphene, graphite and carbon black, where the carbon allotrope material is aligned with at least one polyether urethane fiber belonging to the plurality of non-woven electrospun polyether urethane fibers.

A further embodiment of any of the foregoing deicers can include that the carbon allotrope material is located within at least one of the electrospun polyether urethane fibers.

A further embodiment of any of the foregoing deicers can include a bond layer adjacent the carcass layer and configured to attach the carcass layer to the aircraft structure.

A further embodiment of any of the foregoing deicers can include that the plurality of non-woven electrospun polyether urethane fibers form a scaffold, and that the outer layer further includes a polyester urethane elastomer composition located on a portion of the scaffold.

A further embodiment of any of the foregoing deicers can include that the sheet further includes a polyester urethane elastomer.

A deicer can include an aircraft structure and an outer elastomer layer. The outer elastomer layer can include a non-woven fabric having polyether urethane fibers and one of (1) a carbon allotrope material aligned with at least one of the polyether urethane fibers and (2) a polyester urethane composition located on a portion of the non-woven fabric.

The deicer of the preceding paragraph can optionally include, additionally and/or alternatively, any one or more of the following features, configurations and/or additional components:

A further embodiment of the foregoing deicer can include that the carbon allotrope material is selected from the group consisting of carbon nanotubes, graphene, graphite and carbon black.

A further embodiment of any of the foregoing deicers can include that the non-woven fabric forms a scaffold.

A further embodiment of any of the foregoing deicers can include that the polyether urethane fibers are electro spun polyether urethane fibers.

A further embodiment of any of the foregoing deicers can include that the carbon allotrope material is located within at least one of the electrospun polyether urethane fibers.

A further embodiment of any of the foregoing deicers can include that the outer elastomer layer has a brittle point lower than −40° C. (−40° F.).

A method of forming a layer of a deicer boot includes forming a polyether urethane elastomer sheet having a brittle point lower than −40° C. (−40° F.) and incorporating the polyether urethane elastomer sheet onto an aircraft structure.

The method of the preceding paragraph can optionally include, additionally and/or alternatively, any one or more of the following features, configurations and/or additional components:

A further embodiment of the foregoing method can include that the polyether urethane elastomer sheet includes a polyester urethane elastomer.

A further embodiment of any of the foregoing methods can include electrospinning a plurality of the polyether urethane fibers.

A further embodiment of any of the foregoing methods can include that forming the polyether urethane elastomer sheet includes thermally fusing the plurality of polyether urethane fibers.

A further embodiment of any of the foregoing methods can include that electrospinning at least one of the polyether urethane fibers includes electrospinning the at least one of the polyether urethane fiber with a carbon allotrope material selected from the group consisting of carbon nanotubes, graphene, graphite and carbon black so that the carbon allotrope material is located within the at least one polyether urethane fiber.

A further embodiment of any of the foregoing methods can include forming a non-woven fabric scaffold with the polyether urethane fibers and applying a polyester urethane composition to the scaffold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A deicer comprising:
   an aircraft structure; and
   an outer layer comprising:
      a sheet comprising a polyether urethane elastomer and having a brittle point lower than −40° C. (−40° F.), wherein the sheet is thermally fused from a plurality of non-woven electrospun polyether urethane fibers; and
      a carbon allotrope material within one of the polyether urethane fibers, wherein the carbon allotrope material is aligned with the one of the polyether urethane fibers.

2. The deicer of claim 1, further comprising:
   an inner elastomer layer located between the outer layer and the aircraft structure;
   a carcass layer having inflation tubes and located between the aircraft structure and the inner layer.

3. The deicer of claim 1, wherein the carbon allotrope material is selected from the group consisting of carbon nanotubes, graphene, graphite and carbon black.

4. The deicer of claim 1, further comprising:
   a bond layer adjacent the carcass layer and configured to attach the carcass layer to the aircraft structure.

5. The deicer of claim 1, wherein the plurality of non-woven electrospun polyether urethane fibers form a scaffold, and the outer layer further comprises:
   a polyester urethane elastomer composition located on a portion of the scaffold.

6. The deicer of claim 1, wherein the sheet further comprises a polyester urethane elastomer.

7. A deicer comprising:
   an aircraft structure; and
   an outer elastomer layer comprising:
      a non-woven fabric comprising polyether urethane fibers; and
      a carbon allotrope material within one of the polyether urethane fibers and aligned with the one of the polyether urethane fibers.

8. The deicer of claim 7, wherein the carbon allotrope material is selected from the group consisting of carbon nanotubes, graphene, graphite and carbon black.

9. The deicer of claim 7, wherein the non-woven fabric forms a scaffold.

10. The deicer of claim 7, wherein the polyether urethane fibers are electrospun polyether urethane fibers.

11. The deicer of claim 7, wherein the outer elastomer layer has a brittle point lower than −40° C. (−40° F.).

12. The deicer of claim 7 and further comprising: a polyester urethane composition located on a portion of the non-woven fabric.

13. A method of forming a layer of a deicer boot, the method comprising:
   forming a polyether urethane elastomer sheet having a brittle point lower than −40° C. (−40° F.) from a plurality of polyether urethane fibers;
   aligning a carbon allotrope material within one of the polyether urethane fibers with the one of the polyether urethane fibers; and
   incorporating the polyether urethane elastomer sheet onto an aircraft structure.

14. The method of claim 13, wherein the polyether urethane elastomer sheet includes a polyester urethane elastomer.

15. The method of claim 13, further comprising:
   electrospinning the plurality of polyether urethane fibers.

16. The method of claim 15, wherein forming the polyether urethane elastomer sheet comprises thermally fusing the plurality of polyether urethane fibers.

17. The method of claim 15, wherein the carbon allotrope material is selected from the group consisting of carbon nanotubes, graphene, graphite and carbon black.

18. The method of claim 15, further comprising:
   forming a non-woven fabric scaffold with the plurality of polyether urethane fibers; and
   applying a polyester urethane composition to the scaffold.

* * * * *